United States Patent [19]

Nguyen et al.

[11] Patent Number: 5,742,252

[45] Date of Patent: Apr. 21, 1998

[54] AMBIGUITY RESOLVING ALGORITHM FOR INTERFEROMETERS OF ARBITRAY TOPOLOGIES

[75] Inventors: Trung T. Nguyen, Huntington Beach; Loan Taree Bui, Rosemead, both of Calif.

[73] Assignee: Raytheon Company, Lexington, Mass.

[21] Appl. No.: 703,310

[22] Filed: Aug. 26, 1996

[51] Int. Cl.$^6$ ................................................. G01S 5/02
[52] U.S. Cl. ................................................. 342/156
[58] Field of Search ........................... 342/156, 424, 342/147

[56] References Cited

U.S. PATENT DOCUMENTS 4,728,958   3/1988   Choate .................................. 342/156

*Primary Examiner*—Daniel T. Pihulic

*Attorney, Agent, or Firm*—Glenn H. Lenzen, Jr.; Leonard A. Alkov

[57] ABSTRACT

An apparatus for reducing the computational requirements for resolving ambiguity in interferometer measurements where the interferometer elements are arranged arbitrarily. Each of a plurality of interferometer elements each measures the phase of the incoming electromagnetic signal. The interferometer elements are each separated by lengths defined as baselines, which are sorted and processed in ascending order. Following initialization, for each baseline (92, 108), the phase measurements of the next baseline (92, 108) to be processed are estimated. If the measured phases (94–100, 110–118) of the next baseline (92, 108) falls within a predetermined range (104, 106) of the estimated phases, the phase is retained for estimating the phases of the next baseline. After a sufficient number of baselines have been processed, the angle of the incoming electromagnetic signal may be determined in accordance with the retained phases.

5 Claims, 3 Drawing Sheets

Unambiguous Phase from Baselines 1&2 ($\phi_1$ and $\phi_2$)

Unambiguous Phase from Baseline 3 ($\phi_3$)

Unambiguous Phase from Baseline 4 ($\phi_4$)

⋮

Unambiguous Phase from Baseline N-1 ($\phi_{N-1}$)

Unambiguous Phase from Baseline N ($\phi_N$)

AMBIGUITY RESOLVING ALGORITHM FOR INTERFEROMETERS OF ARBITRAY TOPOLOGIES

BACKGROUND OF THE INVENTION

1. Field of the Invention

The present invention broadly relates to interferometers for tactical system applications, and, more particularly, relates to a system which significantly reduces computational overhead for resolving the angular position of an object with respect to an interferometer array, where the interferometers of the array may be arranged in an arbitrary, three-dimensional topology.

2. Discussion

Many aircraft and other airborne vehicles often detect the presence of electromagnetic signals incident upon the craft. In many instances, it is useful to determine the angle of origination of the electromagnetic signal. The angle of the incoming signal provides the aircraft with a bearing to the source of the electromagnetic signal. This information is useful in responding to the detected electromagnetic signal.

Interferometers provide one such arrangement for tracking the position of the electromagnetic signal. Typically, a plurality of interferometers are linearly arranged on a flat plane in two orthogonal directions so that an azimuth angle and an elevation angle may be determined. The azimuth and elevation of the incoming electromagnetic signal may be determined in accordance with the phases detected by each orthogonal set of interferometers. The phase differences between each interferometer of the plurality may be used to determine the angle of the electromagnetic signal.

Typically, a set of interferometers is arranged in a first direction and a second set of interferometers is arranged in an orthogonal direction, e.g., horizontally and vertically. The interferometers arranged in one direction may provide an azimuth angle information, and the interferometers arranged in the orthogonal direction may provide elevation angle information, or vice versa. For example, in a two-dimensional arrangement in a flat plane, four interferometers are arranged in a first direction and a second set of four interferometers are arranged in an orthogonal direction.

Processing information from a total of eight interferometers requires a significant number of calculations. A typical approach to resolving the angle of the incoming electromagnetic signal employs the Chinese remainder theorem. However, the Chinese remainder theorem requires substantial signal processing to obtain adequate angle resolution. Further, phase noise and resolution may cause undesirable results when using the Chinese remainder theorem. A second approach to resolving the phase differences of the several interferometers into an angle of the incoming electromagnetic signal employs a look-up table. However, look-up table approaches use only half of the available interferometer baselines to estimate an angle relative to the linear baseline. Thus, a significant amount of phase information is required in order to provide an angle of the electromagnetic signal, which requires yet additional signal processing overhead.

Further complicating the use of interferometers to resolve the angle of the electromagnetic signal, modern detection systems generally attempt to combine the sensors for two or more detection systems into one sensor. Present aircraft would not typically include an individual interferometer array. Rather, present aircraft implement the interferometer array by substituting interferometer elements for radar array elements in the phased array radar system of the aircraft. This substitution reduces costs by alleviating the need for an individual interferometer array device, but significantly complicates resolving the angle of the electromagnetic signal because the interferometer elements may not be easily placed in a linear or planar arrangement.

In a typical phased array radar system, the interferometer elements are desirably placed at the edge rather than in the middle of the planar array in order to prevent an increase in the radar cross-section and to maintain the quality of the beam pattern. Placing the interferometer elements on the edge of the array, in an arbitrary arrangement, significantly increases the calculations required to determine the angle of the incoming signal. For example, using the Chinese remainder theorem the angle of an incoming signal is a system having ten interferometer elements arranged two-dimensionally requires $10^{10}$ calculations. Such computational overhead renders the Chinese remainder theorem less desirable for resolving the angle of the incoming signal in two-dimensional interferometer arrangements. In some phased array antennas, the interferometers may be arranged three-dimensionally, adding yet additional overhead required to resolve the angle of the incoming signal.

Thus, it is an object of the present invention to significantly reduce the computational overhead required for resolving the angle of an incoming electromagnetic signal.

It is a further object of the present invention to provide a system for resolving the angle of the incoming signal in which the positions of the interferometers may be arbitrary.

It is yet a further object of the present invention to resolve ambiguity and provide significant improvment in the estimates for both azimuth and elevation based on ambiguous phase measurements from interferometers having more than three baselines, and by using all the interferometer measurements in the estimation.

It is yet a further object of the present invention to provide a system for resolving the angle of the incoming electromagnetic signal when interferometers are arranged either one, two, or three-dimensionally.

SUMMARY OF THE INVENTION

In accordance with the teachings of the present invention, this invention is directed to a system for determining an angle of incidence for an incoming electromagnetic signal. The system comprises a plurality of interferometers each measuring a phase for the incoming electromagnetic signal. The interferometers each are separated by a distance defined as a baseline between any two interferometers. A signal processor computes the angle of the electromagnetic signal in accordance with the phases measured by the interferometers. The processor performs a set-up step to provide initial phase estimates of the incoming electromagnetic signal for two selected baselines. The processor also generates phase estimates for successive baselines in accordance with selected measured phases for a previous baseline in the succession, and determines if a measured phase for the successive baseline is within a predetermined range of the phase estimates. The processor the determines the angle of the incoming electromagnetic signal in accordance with a phase of the last baseline in the succession, where the phase is within the predetermined range of the phase estimates.

Additional objects, features and advantages of the present invention will become apparent from the following description and the appended claims, taken in connection with the accompanying drawings.

DETAILED DESCRIPTION OF A PREFERRED EMBODIMENT

Figure 1:
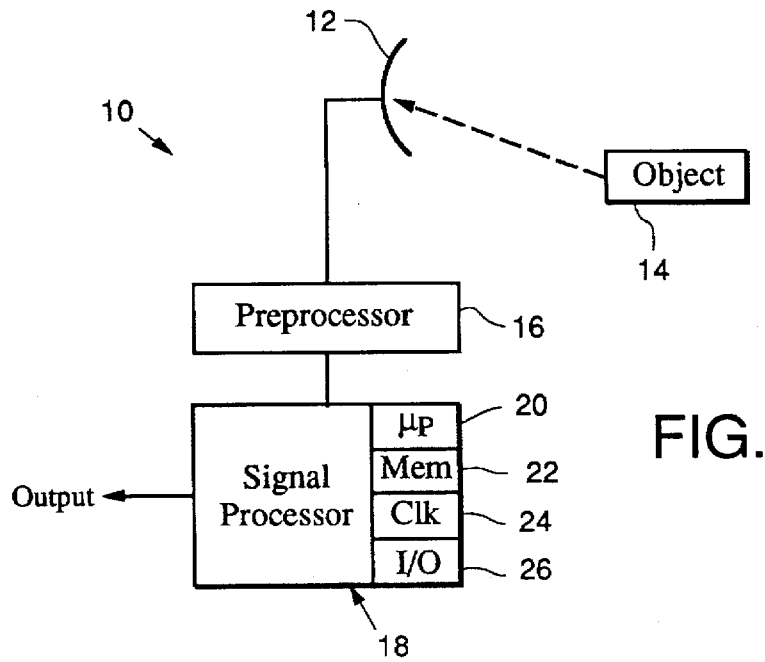
FIG. 1 is a block diagram of a system for determining the angle of an incoming electromagnetic signal arranged in accordance with the principles of the present invention.

Referring to FIG. 1, the present invention provides a system 10 for resolving the ambiguity of interferometers arranged in an arbitrary topology to provide the angle of an incoming electromagnetic signal. It will be understood by one skilled in the art that the term angle refers to both the azimuth and/or the elevation angles of the incoming signal. The system includes a sensor 12 which detects incoming electromagnetic energy radiated by object 14. The sensor 12 comprises an array of interferometer elements which individually measure the phase of the electromagnetic energy radiated by object 12. The sensor 12 may, for example, also comprise a radar array in which selected individual radar array elements are replaced by interferometer elements to implement the system of the present invention. The sensor 12 outputs one or a plurality of signals to a preprocessor 16 which receives the signal and performs various signal conditioning known to those skilled in the art. The preprocessor 16 outputs a signal or signals to signal processor 18 which determines the angle of the incoming electromagnetic signal.

The signal processor 18 may be a microcomputer which includes a microprocessor 20, such as an i860, c40, 96001 or the like. The microprocessor 20 performs various operations on the incoming signals and on data stored in memory 22. A clock 24 provides timing signals to each of the microprocessor 20, the memory 22, and I/O controller 26. An I/O controller 26 manages the input and output of data to microprocessor 20 and signal processor 18. Signal processor 18 determines the angle of the incoming electromagnetic signal radiated by object 14 and outputs the angle for use by other components and modules.

Figure 2:
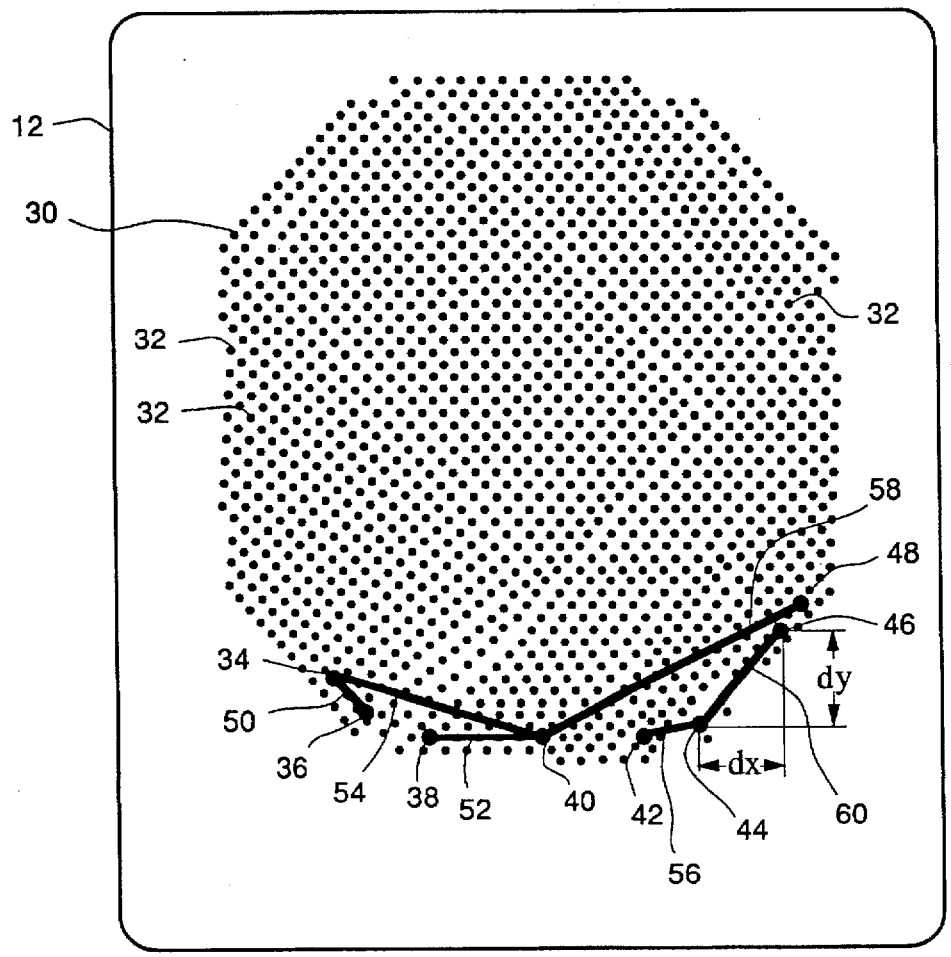
FIG. 2 is a phased array antenna in which a plurality of the individual elements have been replaced with a plurality of interferometer elements which define the interferometer array.

Referring to FIG. 2, a sensor 12 is depicted as a planar radar array 30 having a number of individual radar array elements 32. Sensor 12 also includes eight interferometer elements 34, 36, 38, 40, 42, 44, 46, and 48. FIG. 2 also depicts six baselines 50, 52, 54, 56, 58, and 60, which represent the distance between selected interferometer elements. For example, baseline 50 defines the distance between interferometer elements 34 and 36; baseline 52 defines the distance between interferometer elements 38 and 40; baseline 54 defines the distance between interferometer elements 34 and 40; baseline 56 defines the distance between interferometer elements 42 and 44; baseline 58 defines the distance between interferometer elements 40 and 48; and baseline 60 defines the distance between interferometer elements 44 and 46. It will be noted by those skilled in the art that interferometer elements 34–48 define several potential baselines, but only selected baselines provide a basis for determining the angle of the incoming electromagnetic signal. Also shown in FIG. 2 are exemplary representations of horizontal and vertical lengths, dx and dy, respectively, for baseline 60.

Figure 3:
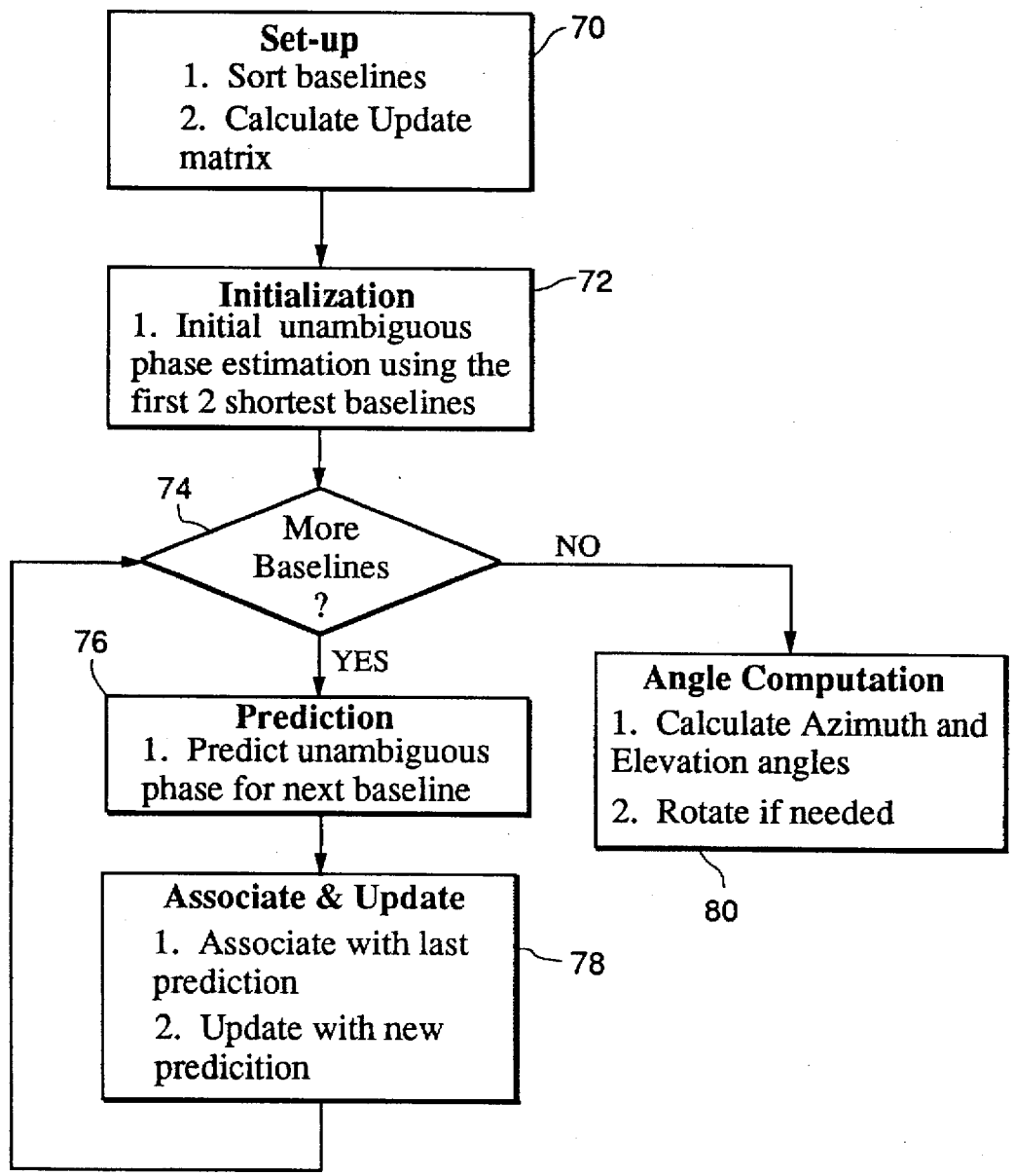
FIG. 3 is a block diagram of a method for determining the angle of the incoming signal in accordance with the principles of the present invention.
Figure 4:
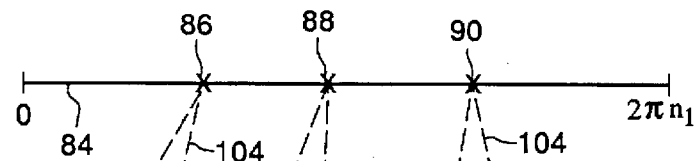
FIG. 4 is a graphical representation of the prediction and association steps described with respect to the method of FIG. 3.
Figure 4:
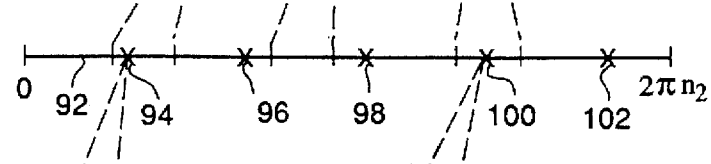
Figure 4:
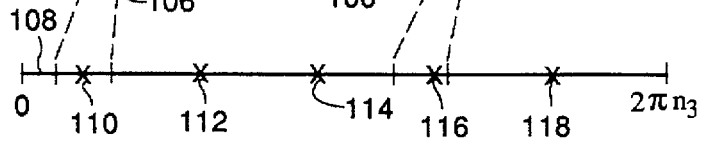
Figure 4:
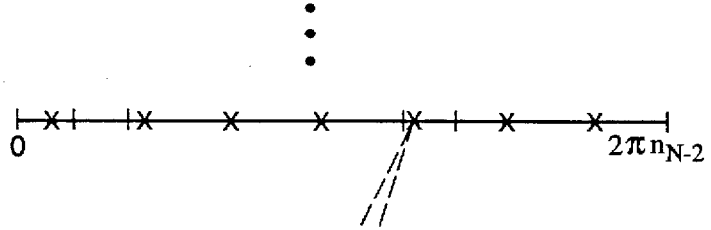
Figure 4:
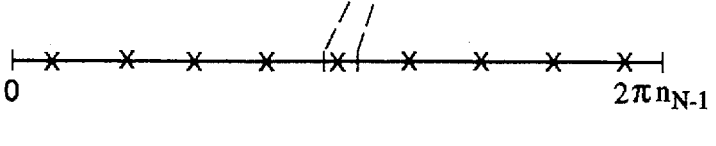

To be explained further with respect to FIGS. 3 and 4, the method for resolving the ambiguity resulting from interferometers having arbitrary topology employs a minimum square error approach. The method includes an initial set up step, an initialization step, an iterative step including predicting, associating, and updating angles, and an angle determination step. The unambiguous phase of the next baseline is predicted using the association of all of the previous phases. If the phase measurements of the next baseline fall within a predicted range, then the unambiguous phases are updated in accordance with the phase measurements. If the next baseline measurements do not fall within the predetermined range, those phase measurements are eliminated.

The input for the method is a set of ambiguous phase measurements $\phi_i$ for each baseline i as follows:

$$\tilde{\phi}_i = \phi_i(\text{mod} 2\pi) = \phi_i + 2\pi K_i; \ \tilde{\phi}_i \in [0, 2\pi]; \quad (1)$$

where $$\phi_i = \frac{2\pi d_x^i}{\lambda} \sin(Az)\cos(El) + \frac{2\pi d_y^i}{\lambda} \sin(El) + n_i; \quad (2)$$

$$|K_i| \leq \kappa_i = \text{int}\left(\frac{\sqrt{(d_x^i)^2 + (d_y^i)^2}}{\lambda}\right) + 1; \quad (3)$$

$d_x^i, d_y^i$ are the x and y components, respectively, of baseline i;

$n_i$ is the phase noise with zero mean and variance $\sigma_n^2$;

Az and El are the azimuth and elevation, respectively, defined with respect to the normal of the antenna plane. For a tilted antenna system, the azimuth and elevation with respect to the airframe (North East Down—NED) are obtained by rotating Ax and El by the tilt angle; and $\lambda$ is the wavelength of the incoming electromagnetic signal.

From Equation (1), it can be seen that the measured value of the phase $\phi_i$ is a function of the estimated value of $\phi_i$ plus some multiplier $K_i$. Equation (2) defines a physical relationship between the estimated phase $\phi_i$ as it relates to the azimuth and elevation of the incoming electromagnetic signal, the Ith baseline, and the phase noise.

Under the minimum error condition, the following is true:

$$\hat{\phi}_{k/k} = \frac{2\pi d_x^k}{\lambda} x_k + \frac{2\pi d_y^k}{\lambda} y_k; \text{ and} \quad (4)$$

$$\hat{\phi}_{k+1/k} = \frac{2\pi d_x^{k+1}}{\lambda} x_k + \frac{2\pi d_y^{k+1}}{\lambda} y_k; \quad (5)$$

where $\hat{\phi}_{k/k}$ is the phase estimate at baseline k for a given k value, and $\hat{\phi}_{k+1/k}$ is the predicted phase estimate at baseline k+1 for a given k value.

The ordered pair $(x_k, y_k)$ is defined with respect to Equations (6)–(11) as shown below:

$$x = \sin(Az)\cos(El); \ y = \sin(El) \quad (6)$$

$$\begin{bmatrix} x_k \\ y_k \end{bmatrix} = H_k \begin{bmatrix} \alpha_{ac}^k \\ \alpha_{bc}^k \end{bmatrix} = H_k \begin{bmatrix} \alpha_{ac}^{k-1} + a_k c_k \\ \alpha_{bc}^{k-1} + b_k c_k \end{bmatrix}; \quad (7)$$

where $$H_k = \begin{bmatrix} \alpha_{aa}^k & \alpha_{ab}^k \\ \alpha_{ab}^k & \alpha_{bb}^k \end{bmatrix}^{-1} = \frac{1}{DEM_k} \begin{bmatrix} \alpha_{bb}^k & -\alpha_{ab}^k \\ -\alpha_{ab}^k & \alpha_{aa}^k \end{bmatrix}; \quad (8)$$

$$DEM_k = \alpha_{aa}^k \alpha_{bb}^k - \alpha_{ab}^k \alpha_{ab}^k; \qquad (9)$$

$$\alpha_{mn}^k = \sum_{i=1}^{k} m_i n_i; \ m,n = a,b,c; \qquad (10)$$

and $$a_i = \frac{2\pi d_x^i}{\lambda} \ ; b_i = \frac{2\pi d_y^i}{\lambda} \ ; \text{and } c_i = \phi_i - n_i. \qquad (11)$$

One skilled in the art will recognize that Equations (6) through (11) result from setting $\phi_i$ equal to a constant in Equation (1) and solving for (x, y) under minimum error conditions.

Further, the variance of the predicted phase is as shown in the following equation:

$$Var(\hat\phi_{k+1/k}) = \left\{ \frac{\sum_{i=1}^{k} [a_{k+1}(\alpha_{bb}^k a_i - \alpha_{ab}^k b_i) + b_{k+1}(\alpha_{aa}^k b_i - \alpha_{ab}^k a_i)]^2}{(DEM_k)^2} \right\} \cdot \sigma_n^2 \qquad (12)$$

FIGS. 3 and 4 provide a flow diagram and a graphical depiction, respectively, of the steps for using the foregoing relationship to carry out the method for determining ambiguous phase measurements for interferometers having an arbitrary topology. In FIG. 3 at SET UP step 70, the baselines are sorted in order of increasing baseline length in accordance with the equation $(d_x^i)^2 + (d_y^i)^2$. After the baselines are sorted, the update matrix $H_k$ of Equation (8) is determined for K=2, 3, ..., N. The update matrix $H_k$ is required for determining $(x_k, y_k)$. Further, the corresponding predicted error Var $(\hat\phi_{k+1/k})$ for the ordered set of baselines is determined in accordance with Equation (12). The predicted errors define the association gate or range, to be described further herein with respect to FIG. 4, in accordance with the following equation:

$$\text{gate}_{k+1} = nsigma \sqrt{Var(\hat\phi_{k+1/k})} \ , \qquad (13)$$

where nsigma is the number of desired standard deviations.

With respect to SET UP step 70, the steps carried out depend only upon the baseline geometry and are independent of the measured data. Therefore, these steps may be carried out prior to measurement and significantly decrease the overhead for determining the angle of the incoming electromagnetic signal.

Following SET UP step 70, the method proceeds to INITIALIZATION step 72. In INITIALIZATION step 72, for all possible ambiguities resulting from the shortest (first two) baselines, the pair $(x_2, y_2)$, are computed using the measured phases $\hat\phi_1$ and $\hat\phi_2$ in accordance with the following equation:

$$\begin{bmatrix} x_2 \\ y_2 \end{bmatrix} = \frac{1}{DEM_2} \begin{bmatrix} b_2 & -b_1 \\ -a_2 & a_1 \end{bmatrix} \begin{bmatrix} c_1 \\ c_2 \end{bmatrix} \qquad (14)$$

From Equation (3), only $(x_2, y_2)$ pairs that satisfy the following equation are saved for further computation:

$$(x_2)^2 + (y_k)^2 \leq 1 \qquad (15)$$

The number of ambiguities, $\kappa_i$, are thus defined by equation (3) for i=1,2. INITIALIZATION step 70 further reduces the overhead required for determining the angle of the incoming electromagnetic signal by determining the ambiguities for the two shortest baselines in advance.

Following INITIALIZATION step 72 control proceeds to TEST block 74 where a test is performed to determine if additional baselines exist. If additional baselines exist control passes to PREDICTION step 76. In PREDICTION step 76, the phase prediction $\hat\phi_{k+1/k}$ for the next baseline (k+1) is determined in accordance with Equation (5). Following determination of the predicted phases $\hat\phi_{k+1/k}$, control proceeds to ASSOCIATE step block 78 where the predicted phases $\hat\phi_{k+1/k}$ determined at step 76 is associated with the phases measured for baseline (k+1). That is, if the measured phases $\hat\phi_{k+1}$ for the (k+1) baseline fall within a predetermined range of the predicted phases $\hat\phi_{k+1/k}$, then the new ordered pair $(x_{k+1}, y_{k+1})$ is computed in accordance with equation (7). Only $(x_{k+1}, y_{k+1})$ pairs that satisfy Equation (15) are saved for further computation, as described above with respect to INITIALIZATION step 72.

Following ASSOCIATE step 78, control proceeds to TEST step 74 to determine if additional baselines exist. If additional baselines exist, PREDICTION step 76 and ASSOCIATE step 78 are executed one again. After all baselines have been exhausted, control proceeds to ANGLE COMPUTATION step 80. At angle computation step 80, the azimuth and elevation angles are determined for each ordered pair $(x_h, y_h)$ in accordance with equation (6), where h is the last baseline having an non-empty set of ordered pairs $(x_{k+1}, y_{k+1})$ output by ASSOCIATE step 78. Further, for tilted antennae systems the azimuth $Az_h$ and elevation $El_h$ are determined by rotating to the airframe coordinate system (NED).

FIG. 4 shows a graphical representation of the PREDICTION and ASSOCIATE steps of the method described in FIG. 3. Each of the horizontal lines in FIG. 4 corresponds to a baseline in the array. Each horizontal line may be used to plot the predicted and measured phases. The phases for each baseline range from zero to $2\pi n$ where n is a constant. For example, the unambiguous phases $\phi_1$ and $\phi_2$ (86, 88, and 90) measured for baselines 1 and 2 are plotted on horizontal line 84. An ordered pair $(x_i, y_i)$ corresponds to each measured phase $\phi_i$ retained for further calculation.

Referring to line 92, line 92 is used to plot the unambiguous phases $\phi_3$ for baseline 3, where the phase ranges from zero to $2\pi n_2$, where $n_2$ is a constant. The X marks (94, 96, 98, 100, and 102) along line 92 represents the measured phases $\hat\phi_{k=3}$. From each measured phase $\hat\phi_{k=3}$, a predicted phase $\hat\phi_{k+1/k}$ (k=3) is determined in accordance with equation (5), and a gate for each $\hat\phi_{k+1/k}$ value is determined in accordance with equation (13). Gates 106 represent the predicted gate or range based on the measured phases $\hat\phi_{k=2}$ 94-102. The measured phases $\phi_4$ for baseline 4 (line 108) are then measured and plotted at marks 110, 112, 114, 116, and 118. Of the measured phases $\phi_3$, phases 94 and 100 fall within the gates predicted based upon predicted phase $\hat\phi_{k+1/k}$ (k=3). These phases are retained.

Similarly, the retained phases from baseline 4 are then used to predict gates from baseline 5. This process repeats for n baselines. As is shown in FIG. 4. After all baselines have been exhausted, control passes to ANGLE COMPUTATION step 80 as described above.

From the foregoing, it can be seen that the present invention significantly reduces the calculations required for determining the angle of the incoming electromagnetic signal. By performing setup and initialization steps in advance prior to making determinations based on measured data, substantial overhead reduction is achieved. Further, the foregoing system and method significantly reduces the calculations over the prior methods for determining the incoming angle of the electromagnetic signal.

Although the invention has been described with particular reference to certain preferred embodiments thereof, variations and modifications can be effected within the spirit and scope of the following claims.

What is claimed is:

1. A system for determining an angle of incidence for an incoming electromagnetic signal, the system comprising:

a plurality of interferometers for detecting the incoming electromagnetic signal, each interferometer measuring a phase based upon the incoming electromagnetic signal in accordance with the position of the interferometer relative the incoming electromagnetic energy, where each interferometer is separated by a distance defined as a linear baseline between the two; and a signal processor for computing the angle of the electromagnetic signal in accordance with the phases measured by the interferometers, the processor performing the steps of:

(a) determining an initial phase estimate in accordance with two selected baselines in order to predict a phase measured for another of the plurality of baselines, (b) for the other baselines, predicting a phase for a next baseline in accordance with the phases measured for a previously selected baseline and measuring the phase of the next baseline to determine if the measured phase is within a predetermined range of the predicted phase, and (c) determining the angle of the incoming electromagnetic signal in accordance with the phases of the last baseline falling within the predetermined ranges of the predicted phases;

wherein the phase measurements $\phi_i$ for an ith baseline may be defined as follows:

$$\tilde{\phi}_2 = \phi_i(\bmod 2\pi) = \phi_i + 2\pi K_i;\ \tilde{\phi}_i \in [0, 2\pi];$$

where $$\phi_i = \frac{2\pi d_x^i}{\lambda} \sin(Az)\cos(El) + \frac{2\pi d_y^i}{\lambda} \sin(EL) + n_i;$$

$$|K_i| \leq \kappa_i = int\left(\frac{\sqrt{(d_x^i)^2 + (d_y^i)^2}}{\lambda}\right) + 1;$$

$d_x^i, d_y^i$ are the x and y components, respectively, of baseline i;

$n_i$ is the phase noise with zero mean and variance $\sigma_n^2$;

Az and El are the azimuth and elevation, respectively, defined with respect to the normal of the antenna plane; and $\lambda$ is the wavelength of the incoming electromagnetic signal.

2. The system of claim 1 wherein the estimated phase $\hat{\phi}_{k/k}$ is defined as follows:

$$\hat{\phi}_{k/k} = \frac{2\pi d_x^k}{\lambda} x_k + \frac{2\pi d_y^k}{\lambda} y_k;$$

where $\hat{\phi}_{k/k}$ is the phase estimate at baseline k for a given k value.

3. The system of claim 2 wherein an ordered pair exists as defined below:

$$x = \sin(Az)\cos(El);\ y = \sin(El)$$

$$\begin{bmatrix} x_k \\ y_k \end{bmatrix} = H_k \begin{bmatrix} \alpha_{ac}^k \\ \alpha_{bc}^k \end{bmatrix} = H_k \begin{bmatrix} \alpha_{ac}^{k-1} + a_k c_k \\ \alpha_{bc}^{k-1} + b_k c_k \end{bmatrix};$$

where $$H_k = \begin{bmatrix} \alpha_{aa}^k & \alpha_{ab}^k \\ \alpha_{ab}^k & \alpha_{bb}^k \end{bmatrix}^{-1} = \frac{1}{DEM_k} \begin{bmatrix} \alpha_{bb}^k & -\alpha_{ab}^k \\ -\alpha_{ab}^k & \alpha_{aa}^k \end{bmatrix};$$

$$DEM_k = \alpha_{aa}^k \alpha_{bb}^k - \alpha_{ab}^k \alpha_{ab}^k;$$

$$\alpha_{mn}^k = \sum_{i=1}^{k} m_i n_i;\ m,n = a,b,c;$$

and $$a_i = \frac{2\pi d_x^i}{\lambda};\ b_i = \frac{2\pi d_y^i}{\lambda};\ \text{and } c_i = \phi_i - n_i.$$

4. The system of claim 3 wherein the predicted phase $\phi_{k+1/k}$ has a variance Var ($\phi_{k+1/k}$) defined in accordance with $$Var(\phi_{k+1/k}) = \left\{ \frac{\sum_{i=1}^{k} [a_{k+1}(\alpha_{bb}^k a_i - \alpha_{ab}^k b_i) + b_{k+1}(\alpha_{aa}^k b_i - \alpha_{ab}^k a_i)]^2}{(DEM_k)^2} \right\} \cdot \sigma_n^2$$

5. The system of claim 4 wherein the predetermined range gate k+1 is defined as $$gate_{k+1} = nsigma \sqrt{Var(\phi_{k+1/k})},$$

where nsigma is the number of desired standard deviations.

* * * * *